United States Patent [19]

Short et al.

[11] Patent Number: 4,769,100

[45] Date of Patent: Sep. 6, 1988

[54] METHOD OF APPLYING CARRIER FILMS PREPAINTED WITH METALLIC PAINT TO AUTOMOBILE BODY PANELS

[75] Inventors: William T. Short, Southfield; Charles C. Mentzer; Howard W. Cox, both of Birmingham, all of Mich.

[73] Assignee: General Motors Corporation, Detroit, Mich.

[21] Appl. No.: 881,287

[22] Filed: Sep. 22, 1986

[51] Int. Cl.$^4$ .............................................. B60R 13/00
[52] U.S. Cl. .................................... 156/285; 156/212; 156/286; 264/101; 264/102; 264/108; 428/31
[58] Field of Search ....................... 156/285, 212, 286; 427/360, 369, 370, 191, 192, 189, 190; 106/290; 264/108, 102; 428/31

[56] References Cited

U.S. PATENT DOCUMENTS

| | | | |
|---|---|---|---|
| 2,418,479 | 4/1947 | Pratt et al. | 106/179 X |
| 4,052,241 | 10/1977 | Walter | 156/285 X |
| 4,407,685 | 10/1983 | Hankland | 156/212 |
| 4,496,628 | 1/1985 | Deatcher et al. | 428/337 |
| 4,550,052 | 10/1985 | Malek | 264/175 X |

Primary Examiner—Michael Ball
Assistant Examiner—Jeff H. Aftergut
Attorney, Agent, or Firm—R. W. Tung

[57] ABSTRACT

A method of applying a carrier film prepainted with metallic paint containing metal flakes to an automobile body panel in a vacuum forming process.

2 Claims, 2 Drawing Sheets

METHOD OF APPLYING CARRIER FILMS PREPAINTED WITH METALLIC PAINT TO AUTOMOBILE BODY PANELS

FIELD OF THE INVENTION

The present invention generally relates to a method of applying a painted carrier film to an automobile body panel and, more particularly, is concerned with a method of applying a carrier film prepainted with metallic paint to an automobile body panel.

BACKGROUND OF THE INVENTION

Automobile body panels are traditionally made of sheet metal or plastics painted with layers of pigmented paints. The painting process of these panels requires elaborate facilities and consequently large expenses. For instance, a large floor space area must be maintained in a clean room environment for the spraying of paint and clear coat and for the baking and curing of such paint and clear coat on the body panels. Moreover, solvent based paints are considered undesirable in recent years because of environmental concerns. As a result, the evaporation of such solvents must be strictly controlled.

The color matching of metallic paints containing metallic flakes has been a difficult task. This is because the color appearance of metallic paints is dependent upon the flake orientation in the paint film to a large extent. The flake orientation, in turn, is dependent upon many processing parameters. These parameters include the angle of spraying, the distance of spraying, the viscosity of the paint, etc.

It is, therefore, an object of the present invention to eliminate the painting process completely in an automobile assembly plant by using prepainted carrier films.

It is another object of the present invention to apply prepainted carrier films to vehicle body panels in an automated process.

It is a further object of the present invention to apply prepainted carrier films to vehicle body panels such that all the body panels mounted on an automobile are color matched within acceptable tolerance.

It is yet another object of the present invention to apply prepainted carrier films to automobile body panels such that a perfect color match is achieved on an automobile when metallic paints are used.

SUMMARY OF THE INVENTION

In accordance with a preferred practice of our invention, a method of applying prepainted carrier films to automobile body panels such that all the body panels have the same color appearance can be carried out by the following operative steps. First, a layer of a pigmented paint is applied to a plastic film having sufficient thickness in rigidity. A layer of clear coat may optionally be applied on top of the paint layer to further improve the appearance. The uncoated side of this plastic film is coated with a layer of pressure sensitive adhesive. This prepainted carrier film is then heated in an oven to a temperature at which the plastic film became sufficiently pliable such that it may be vacuum formed. This heated prepainted film is then positioned over a substrate for a body panel in a vacuum forming device. Vacuum is withdrawn from under the prepainted film such that the film wraps around and sticks to the substrate without forming defects such as air bubbles.

In our alternate embodiment, vacuum holes are drilled into a supporting buck for the substrate in such a way that a heated film edge-wraps the substrate so that the edges of the substrate are covered by prepainted film. After the excess film is trimmed off the substrate along the edges of the part, a completed automobile body panel with a painted surface is ready for assembly to an automobile.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

Figure 1:
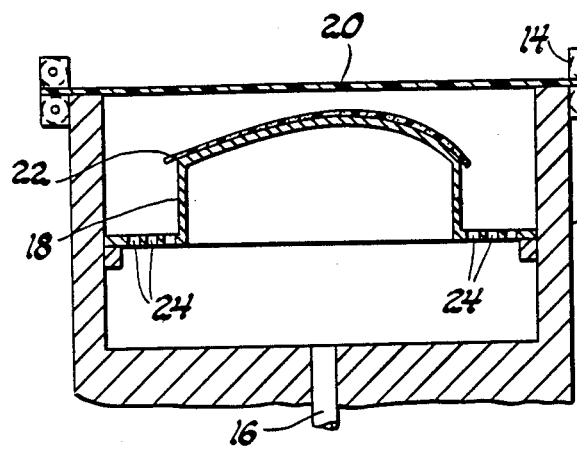
FIG. 1 is a schematic showing a vacuum forming setup wherein a prepainted carrier film is stretched over a substrate to be covered.

Referring initially to FIG. 1 where a schematic of a vacuum former 10 is shown. Vacuum former 10 is constructed of a vacuum box 12, a stretcher frame 14, a vacuum port 16, and a support buck 18. A prepainted carrier film 20 is first loaded into stretcher frame 14 with the paint side up. A substrate 22 which is to be covered by the prepainted carrier film 20 is loaded onto support buck 18. The support buck 18 is mounted on a vacuum plate 24 for the evacuation of air trapped under prepainted carrier film 20. The substrate 22 may be constructed of any material such as a reaction precursor of urethane, a reaction precursor of nylon, a glass filter reinforced sheeting molding compound, an injection moldable thermoplastic, and a metallic material.

The carrier film we have used was either an extruded polyurethane film supplied by Dow Chemical Company or a thermoplastic polyester film supplied by Eastman Chemical Products. The thickness of the film is approximately 0.010 inch. The backside of the film was coated with a commercial acrylic contact adhesive which can be activated at 280° F. The carrier films were coated by a spray painting technique with a red maple metallic paint supplied by the PPG Industries, Durethane ® 101. The size of the film samples used was approximately 60 centimeters by 60 centimeters. The carrier films were hand sprayed to an average coating thickness of between 0.001 and 0.004 inch. The cure conditions used for these prepainted carrier films were 110° C. and 30 minutes.

Figure 9:
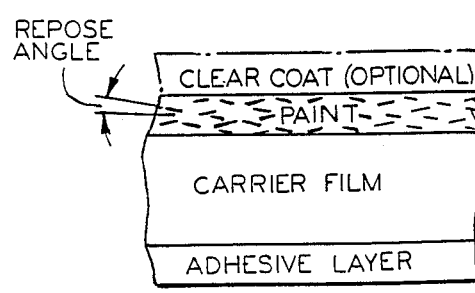
FIG. 9 is a schematic showing an enlarged cross-sectional view of a stretched prepainted carrier film.

An enlarged cross-sectional view of such a carrier is shown in FIG. 9.

As shown in FIG. 1, prepainted carrier film 20 is clamped into a stretcher frame 14 which can be moved horizontally into an oven (not shown) for heating. We have used an oven equipped with quartz heaters for rapid heating the film to a temperature of approximately 300° F. An optical thermometer was used to monitor the surface temperature of the film in the oven. Once the surface temperature reaches the desirable forming temperature, the stretcher frame 14 is rapidly moved out of the oven and positioned over the top of vacuum box 12.

Figure 2:
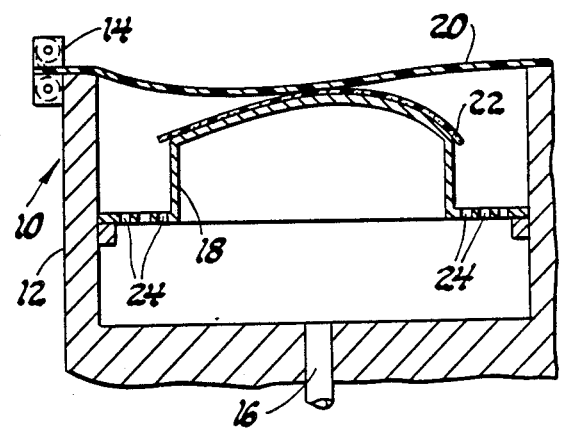
FIG. 2 is a schematic showing vacuum is applied from the bottom of the forming box to pull down a film onto the substrate.

FIG. 2 shows a heated prepainted carrier film 20 sagging from its clamped position into vacuum box 12. Vacuum is then pulled immediately from the bottom of vacuum box 12 through vacuum port 16 to evacuate air trapped under carrier film 20.

Figure 3:
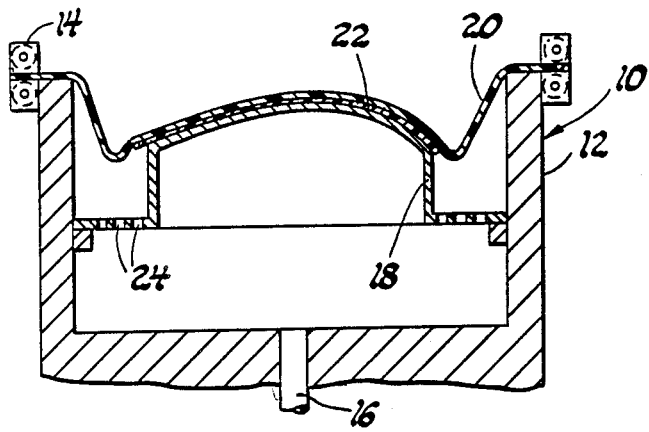
FIG. 3 is a schematic showing a prepainted carrier film completely covered a substrate under vacuum.

FIG. 3 shows that as air has been evacuated out of vacuum box 12, prepainted carrier film 20 is pulled down further onto substrate 22 to cover the entire surface. Carrier film 20 sticks to the substrate on contact by the acrylic adhesive backing.

Figure 4:
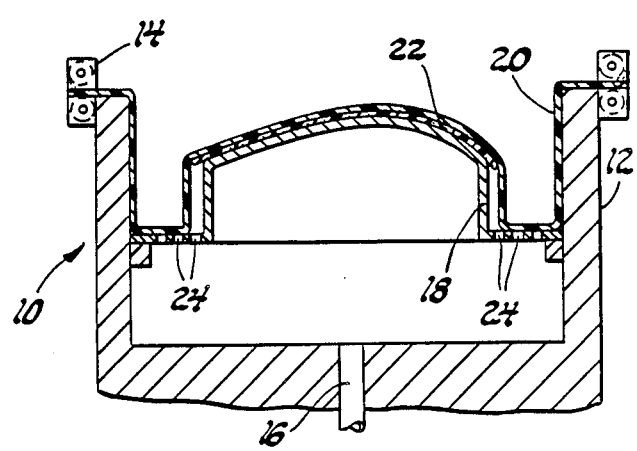
FIG. 4 is a schematic showing a prepainted film pulled down evenly over the edges of the substrate.

FIG. 4 shows the final stage of the vacuum forming process wherein more air is evacuated out of vacuum box 12. It is seen that film 20 is now pulled down evenly over edges of support box 18. The substrate 22 with the prepainted carrier film 20 adhered to it can now be removed out of vacuum box 12 to trim off the excess film along the edges of the substrate.

Figure 5:
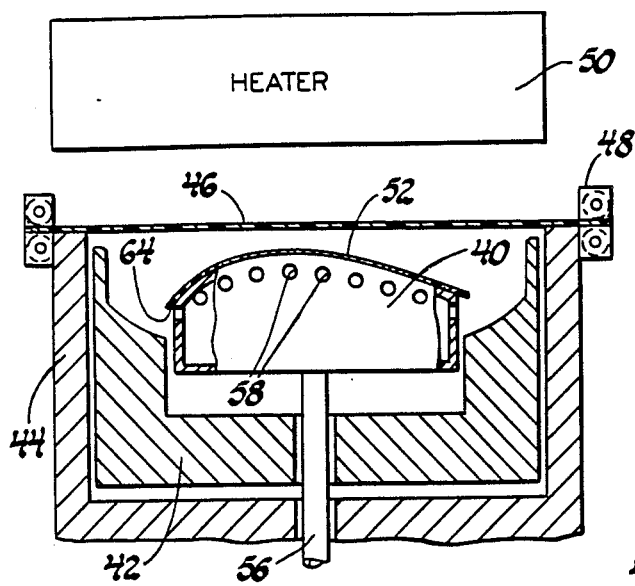
FIG. 5 is a schematic showing our alternate embodiment wherein a support buck, an inner box, and an outer vacuum box are used.
Figure 6:
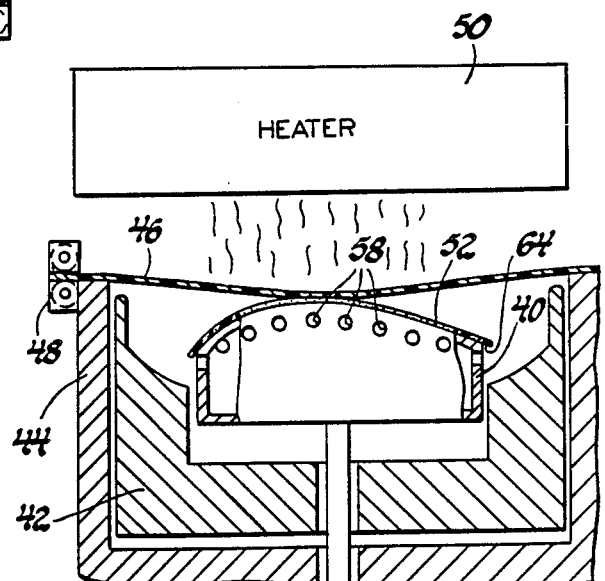
FIG. 6 is a schematic showing vacuum pulled from under the support buck after the inner box is raised.

An alternate embodiment of our invention is shown in FIGS. 5–8. In this alternate embodiment a movable support buck and a movable inner vacuum box are used instead of the stationary support buck used in the previous embodiment. This is shown in FIG. 5 where a movable support buck 40 and a movable inner box 42 are mounted inside an outer vacuum box 44. Note that both the support buck 40 and the inner box 42 are mounted on air cylinders (not shown) which can be moved up and down as desired. FIG. 5 also shows a prepainted carrier film 46 mounted in stretcher frame 48 which can be moved rapidly in and out of a heater 50. At the start of the forming cycle, FIG. 5, substrate 52 for a body panel is placed on support buck 40 with the support buck 40 in its up position. The prepainted carrier film 46 is prepared similarly as in previous embodiment. The carrier film 46 is placed under heater 50 until the surface temperature of the film reaches 300° F. and starts sagging. It is then rapidly moved out of the heater and positioned over vacuum box 44. The support buck 40 is rapidly raised such that carrier film 46 touches the highest point of substrate 52. Vacuum is drawn through vacuum port 56 to evacuate trapped air under carrier film 46. The evacuation of air is carried out by pulling vacuum around the edges of the substrate 52 through vacuum holes 58 drilled in the top edge of support buck 40.

Figure 7:
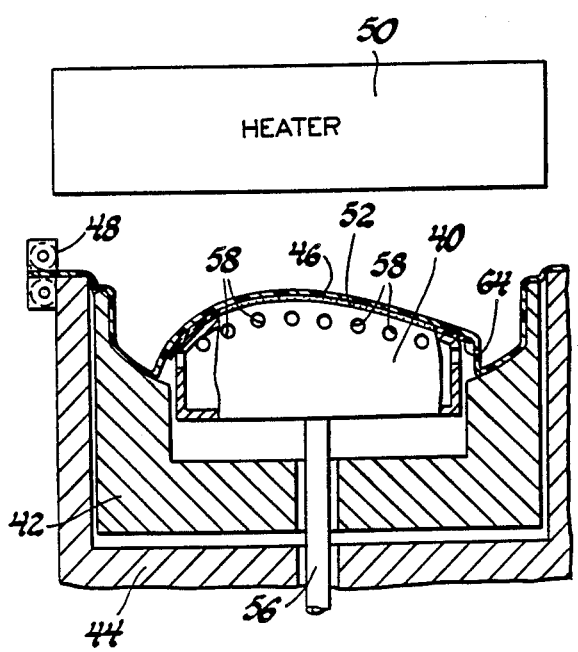
FIG. 7 is a schematic showing a prepainted carrier film stretched down to cover the substrate and sides of the inner box.
Figure 8:
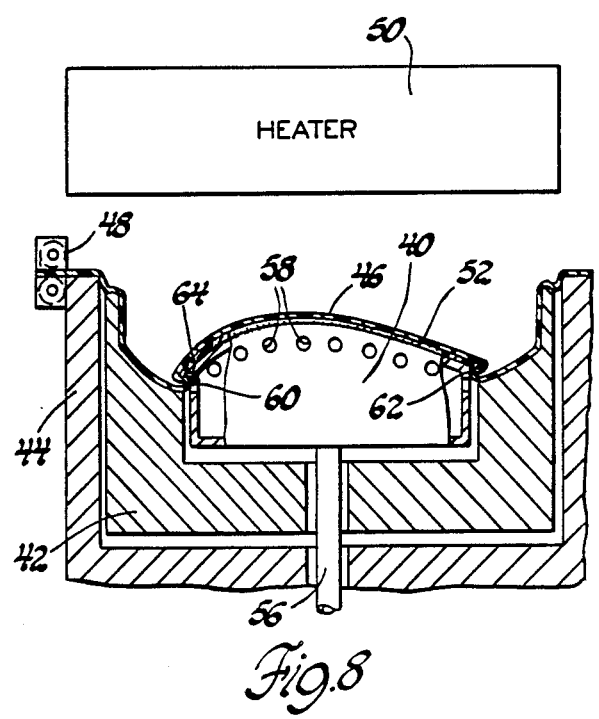
FIG. 8 is a schematic showing the support buck in a lowered position for the to edge-wrapping of the substrate.

FIG. 7 shows prepainted carrier film 46 continues to be drawn down onto the substrate 52 and adheres to it on contact with no air entrapment. As the carrier film 46 reaches the edges of substrate 52 and continues to be drawn down onto the sides of support buck 40, it creates a stretched film section between the edges of the substrate and the sides of the support buck 40. In the final step of our stretch forming process as shown in FIG. 8, support buck 40 together with substrate 52 on it are dropped approximately one inch causing the stretched carrier film 46 to droop at 60. As air being continuously withdrawn from the cavity between support buck 40 and inner box 42, the stretched carrier film 46 is pulled under the substrate 52 at 62 where it adheres on contact to the backside edges 64 of substrate 52. This last step of the stretch forming process wherein support buck 40 and substrate 52 are both dropped accomplishes an important task of edge-wrapping the carrier film to the backside of the substrate. This, when done in an automated manner, saves the manual labor otherwise required to edge wrap each substrate. The substrate with the prepainted carrier film adhered to it may now be removed for trimming operation.

We have discovered that during our vacuum forming process, a deformation of between 30% to 150% has occurred in the stretched carrier film when the film sagged after heating and then pulled by vacuum onto the substrate. The contour of our substrate and its orientation determines largely the localized deformation of the carrier film. We have discovered that by stretching the paint film on the carrier film, the metal flakes contained in a metallic paint film are oriented in such a way as to greatly improve color uniformity. For instance, when a red metallic urethane paint supplied by PPG Industries (Durethane ® 101) was used, the metal flakes contained in the paint layer are oriented in such a way that over 90% of the flakes have a repose angle of less than 10°. This flake orientation is shown in FIG. 9. The repose angle is measured as the angle between a metal flake and the surface of the paint layer. These data were obtained when a carrier film was deformed to a strain of 22% 43%, 67%, and 109% at various locations after a stretch forming process. The percent of metal flakes having a repose angle of less than 10° is between 92–97%. This is compared to a much lower percentage at 70% measured in a carrier film which was not deformed. Therefore, by using our novel vacuum forming process, the color appearance in a prepainted carrier film with metallic paints can be greatly improved. This is significant since color matching a metallic paint has always been a very difficult task.

We have also discovered that when an improvement in gloss level of a finished product is desired, a thin layer of clear coat may be applied to the prepainted carrier film either before the vacuum forming process or after the vacuum forming process. In a mass production system as that used in the automotive industry, it is more desirable to put a clear coat on top of a prepainted carrier film before the vacuum forming process. Conceivably, large rolls of carrier films may be coated with a pigmented paint layer and a clear coat layer and baked through a baking cycle to cure both the paint layer and the clear coat layer. This roll of film may then be stored for future usage when such color on a vehicle body panel is called for. Our novel invention enables a complete elimination of paint facilities in an automobile assembly plant where prepainted carrier films may be vacuum formed directly onto vehicle body panels in a simple and automated process.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of making a plurality of automobile body panels each comprising an external sheet layer and an underlying substrate layer, said external sheet layer having a top surface and a bottom surface wherein said top surface is painted to a predetermined color with a urethane paint, said bottom surface is bonded to said underlying substrate layer of suitable material such that the color appearance of said panels conforms substantially to a color standard when mounted on a vehicle, comprising the steps of:
  (a) applying said paint containing metal flakes to the top surface of said sheet layer and baking for a sufficient length of time to adequately cure said paint,
  (b) coating the bottom surface of said sheet with a layer of adhesive,
  (c) heating said sheet to a temperature at which said sheet becomes sufficiently pliable for vacuum forming,
  (d) positioning said heated sheet section over a substrate and drawing vacuum through vacuum ports located underneath said substrate such that said sheet draws, said drawing process aligns substantially all the metal flakes contained in said paint layer such that the color appearance of said plurality of panels conforms substantially to a color standard, and
  (e) vacuum forming said drawn sheet over and causing said sheet to adhere to said substrate.

2. A method of making a plurality of automobile body panels each comprising an external sheet layer and an underlying substrate layer, said external sheet layer having a top surface and a bottom surface wherein said top surface is painted to a predetermined color with a urethane paint, said bottom surface is bonded to said underlying substrate layer of suitable material such that the color appearance of said panels conforms substantially to a color standard when mounted on a vehicle, comprising the steps of:
  (a) applying said paint containing metal flakes to the top surface of said sheet layer and baking for a sufficient length of time to adequately cure said paint,
  (b) coating the bottom surface of said sheet with a layer of adhesive,
  (c) heating said sheet layer to a temperature at which said sheet becomes sufficiently pliable for vacuum forming,
  (d) positioning said heated sheet section over a substrate and drawing vacuum through vacuum ports located underneath said substrate such that said sheet draws, said drawing process aligns substantially all the metal flakes contained in said paint layer to a repose angle of less than 10° such that said plurality of panels have the same color appearance, and
  (e) vacuum forming said drawn sheet over and causing said sheet to adhere to said substrate.

* * * * *